United States Patent
Corda et al.

(10) Patent No.: US 9,414,095 B1
(45) Date of Patent: Aug. 9, 2016

(54) LINEAR VIDEO DISTRIBUTION METHODS, SYSTEMS, AND DEVICES

(71) Applicant: SES S.A., Betzdorf (LU)

(72) Inventors: Steven Corda, Belle Mead, NJ (US); Ramiro Reinoso, Holland, PA (US); Stanley Russo, Howell, NJ (US); Bronwyn Fisher Fiely, Lake Como, NJ (US)

(73) Assignee: SES S.A., Betzdorf (LU)

( * ) Notice: Subject to any disclaimer, the term of this patent is extended or adjusted under 35 U.S.C. 154(b) by 0 days.

(21) Appl. No.: 14/683,375

(22) Filed: Apr. 10, 2015

(51) Int. Cl.
| | |
|---|---|
| *H04N 7/173* | (2011.01) |
| *H04N 21/435* | (2011.01) |
| *H04N 21/2347* | (2011.01) |
| *H04L 29/06* | (2006.01) |

(Continued)

(52) U.S. Cl.
CPC ............ *H04N 21/2347* (2013.01); *G11B 27/10* (2013.01); *H04L 65/4076* (2013.01); *H04N 21/2541* (2013.01); *H04N 21/4408* (2013.01); *H04N 21/4627* (2013.01); *H04N 21/6118* (2013.01); *H04N 21/6143* (2013.01); *H04N 21/6405* (2013.01); *H04N 21/6408* (2013.01); *H04N 21/64322* (2013.01); *H04N 21/8456* (2013.01); *H04N 21/85406* (2013.01)

(58) Field of Classification Search
CPC combination set(s) only.
See application file for complete search history.

(56) References Cited

U.S. PATENT DOCUMENTS

| | | |
|---|---|---|
| 8,018,934 B2 | 9/2011 | Liu |
| 8,108,901 B2 | 1/2012 | Nicas et al. |

(Continued)

FOREIGN PATENT DOCUMENTS

| | | |
|---|---|---|
| KR | 1020130090103 A | 8/2013 |
| WO | WO 2007/095478 A2 | 8/2007 |
| WO | WO 2009/076121 A1 | 6/2009 |

OTHER PUBLICATIONS

"Converting your multicast IPTV Freeview to HTTP unicast using udpxy", The Angry Technician, http://angrytechnician.wordpress.com/2012/07/31/converting-your-multicast-iptv-freeview-to-http-unicast-using-udpxy/, Jul. 31, 2012, 8 pages.

(Continued)

*Primary Examiner* — Kieu Oanh T Bui
(74) *Attorney, Agent, or Firm* — Wolf, Greenfield & Sacks, P.C.

(57) ABSTRACT

The invention notably relates to the linear distribution of video programs, or segment(s) thereof, to end user devices. Video programs, or segment(s) thereof, received from one or more content source, are encoded and encapsulated into IP video streams. The streams are transmitted to a satellite operator network operation center (NOC), which encrypts the streams. The encrypted streams are transmitted, as multicast video streams, through a satellite, to one or more cable television headend, and then, over an IP-based network, to cable modems located within subscriber premises. An IP-enabled end user device transmits, to a gateway associated with one of the cable modems, a command requesting that the IP-enabled end user device obtain a requested video stream as a unicast stream. Upon receiving the command, the gateway triggers the conversion, at the gateway, of the requested video stream from multicast to unicast for transmission over a home network provided within the subscriber premises. The requested video stream is then transmitted, over the home network, to said end user device, which decrypts and decodes the requested video stream into the original video program, or segment(s) thereof, so that it can be displayed to the end user.

20 Claims, 5 Drawing Sheets

(51) Int. Cl.

| | | |
|---|---|---|
| *H04N 21/61* | (2011.01) | |
| *H04N 21/6405* | (2011.01) | |
| *H04N 21/6408* | (2011.01) | |
| *H04N 21/643* | (2011.01) | |
| *H04N 21/4408* | (2011.01) | |
| *H04N 21/254* | (2011.01) | |
| *H04N 21/4627* | (2011.01) | |
| *H04N 21/854* | (2011.01) | |
| *H04N 21/845* | (2011.01) | |
| *G11B 27/10* | (2006.01) | |

(56) References Cited

U.S. PATENT DOCUMENTS

| | | |
|---|---|---|
| 8,887,214 B1 | 11/2014 | Black et al. |
| 2008/0250462 A1 | 10/2008 | Crohas |
| 2011/0107364 A1 | 5/2011 | Lajoie et al. |
| 2012/0023533 A1 | 1/2012 | Wang et al. |
| 2012/0173746 A1 | 7/2012 | Salinger et al. |
| 2014/0130074 A1 | 5/2014 | Ou et al. |
| 2014/0237534 A1 | 8/2014 | Salinger et al. |
| 2014/0281027 A1 | 9/2014 | Gast et al. |
| 2014/0282777 A1 | 9/2014 | Gonder et al. |

OTHER PUBLICATIONS

Joe Godas, et al., "IP Multicast in Cable Networks", Cisco Systems, Inc., White Paper, 2005.

Fred Dawson, "CableLabs, Vendors Prepare to Solve Multicast Problem", http://www.screenplaysmag.com/2014/04/23/cablelabs-vendors-prepare-to-solve-multicast-problem/, Apr. 23, 2014, 3 pages.

R. Victor Jones, *An Introduction to Basic CATV*, Introduction to CATV (May 10, 2004), http://people.seas.harvard.edu/~jones/cscie129/nu_lectures/lecture13/CATV/CATV.html.

SysMaster, muSwitch Multicast-to-Unicast Converter (last visited Jan. 1, 2015), http://www.sysmaster.com/products/multicast_unicast_converter.php, 2 pages.

Netflix, Inc., *Netflix Open Connect*, Netflix Open Connect Content Delivery Network (last visited Mar. 19, 2015), https://openconnect.itp.netflix.com/.

Pavel V. Cherenkov, Udpxy (May 17, 2014), http://www.udpxy.com/index-en.html.

LINEAR VIDEO DISTRIBUTION METHODS, SYSTEMS, AND DEVICES

TECHNICAL FIELD

The present invention relates to the delivery of video services, and relates in particular to linear video distribution. The invention may notably be used, but is not limited to, delivering high-definition (HD) or ultra-high-definition (UHD) television programs or segments thereof to end user devices.

BACKGROUND

There is a constant need, in the fields of telecommunication and broadcasting, to deliver content, such as for example video content, to end users with a high quality of service (QoS) at an affordable cost. There is also a need for ubiquitously delivering content wherever the end user may be.

Today, the distribution of linear video content, such as for example HD video content, over coaxial cable systems is primarily performed through the use of non IP-based systems. These systems are built around legacy hardware that is not readily upgradable or economically viable to carry UHD video content.

Currently, over-the-top (OTT) service providers such as Netflix provide non-linear video delivery over cable operators' broadband IP network in both HD and UHD formats. However, these services are not readily adaptable to linear UHD nor are they scalable to large audience viewing primarily due to their unicast transmission format.

US 2014/0282777 A1 relates to networking and content delivery, and in particular to methods for the delivery of IP packetized content as either a multicast or unicast. This is a so-called hybridized delivery where the delivery of packetized content is made as a multicast in some instances, and a unicast in other instances. In an embodiment, a gateway apparatus determines whether content requested by IP capable customer-premises equipment (CPE) is among the content currently being provided in an existing multicast stream to the gateway apparatus. If it is determined that a multicast for delivery of the identified content exists, the gateway apparatus joins the multicast. Alternatively, if it is determined that a multicast for delivery of the identified content does not exist yet, it is determined whether one should be created, for example based on the popularity of the particular content. If, upon evaluating the request, it is determined that the identified content will not be delivered via a multicast, it is instead delivered via unicast to the requesting device. If, upon evaluating the request, it is determined that the identified content will be delivered via a multicast, an edge device requests and processes the content fragments. Afterwards, the gateway joins the multicast group in order to receive the requested content as a multicast stream. The gateway then processes the received multicast so that it may be delivered as a unicast to the requesting CPE.

It is desirable to improve the methods and systems of the prior art, with in mind notably the aims of providing simple, reliable, and manageable architectures.

SUMMARY

To meet or at least partially meet the above-mentioned goals, methods, systems, devices, computer programs, and storage mediums according to the invention are defined in the independent claims. Particular embodiments are defined in the dependent claims.

In one embodiment, a method is provided for linear distribution of video programs, or segment(s) thereof, to end user devices. The method comprises the following steps. Video programs, or segment(s) thereof, received from at least one content source, are encoded and encapsulated into Internet Protocol (IP) video streams. The IP video streams are then transmitted to a satellite operator network operation center (NOC), which encrypts the streams. The streams are then transmitted, as multicast video streams, through a satellite, to one or more cable television headend(s). The cable television headend(s) in turn transmits the video streams as multicast video streams, over an IP-based network, to cable modems located within subscriber premises. At one point in time, an IP-enabled end user device then transmits, to a gateway associated with one of the cable modems, a command requesting that the end user device obtain one of the video streams, said video stream being hereinafter referred to as "requested video stream", and that the end user device obtain said video stream as a unicast stream. Upon receiving the command, the gateway triggers the conversion, at the gateway, of the requested video stream from multicast to unicast for transmission over a home network provided within the subscriber premises. The requested video stream is then transmitted, over the home network, to said IP-enabled end user device, which decrypts and decodes the requested video stream into the original video program, or segment(s) thereof, so that it can be displayed to the end user.

The method enables the use of—for example—the cable operators' broadband IP network to distribute video content to consumers' homes, without requiring costly upgrades to the legacy non-IP video distribution system. The multicast-over-IP transmission along with multicast-to-unicast conversion within the consumers' homes allows to more efficiently provide large-scale distribution of linear video content, such e.g. UHD video content, as in a cost effective manner.

The method also enables the end user device to request the multicast stream to the gateway, and to instruct the gateway to deliver the content in unicast stream. In such a manner, the network does not have to implement the logic to determine which stream should be sent in unicast. A simpler gateway is thus provided, which is under the control of the end user device insofar as the multicast-to-unicast conversion is concerned.

The invention also relates, in one embodiment, to a system for linear distribution of video programs, or segment(s) thereof, to end user devices. The system comprises an encoder, a satellite operator NOC, a cable television headend, an IP-enabled end user device, and a gateway. The encoder is configured for encoding video programs, or segment(s) thereof, received from at least one content source and encapsulating them into IP video streams. The encoder is also configured for transmitting the streams to the satellite operator NOC. The satellite operator NOC is configured for encrypting the streams and transmitting the encrypted video streams, as multicast video streams, through a satellite, to the at least one cable television headend. The cable television headend(s) is configured for transmitting the video streams as multicast video streams, over an IP-based network, to cable modems located within subscriber premises. The IP-enabled end user device is configured for transmitting, to a gateway associated with one of the cable modems, a command requesting that the end user device obtain one of the video streams (said video stream being hereinafter referred to as "requested video stream"), and that the end user device obtain said requested video stream as a unicast stream. The gateway is configured for, upon receiving the command, triggering the conversion, at the gateway, of the requested video stream from multicast to unicast for transmission over a home network provided within the subscriber premises. The gateway is also configured for transmitting the requested video stream, over the home network, to said IP-enabled end user device. Furthermore, the end user device is also configured for decrypting and decoding the requested video stream into the original video program, or segment(s) thereof, so that it can be displayed to the end user.

The invention further relates, in one embodiment, to a gateway for participating in the linear distribution of video programs, or segment(s) thereof, to end user devices. The gateway in this embodiment is configured: (i) for receiving, from an IP-enabled end user device, a command requesting that the end user device obtain one of a plurality of video streams and that the end user device obtain said requested video stream as a unicast stream; (ii) for, upon receiving the command, triggering the conversion, at the gateway, of the requested video stream from multicast to unicast for transmission over a home network provided within subscriber premises; and (iii) for transmitting the requested video stream, over the home network, to said IP-enabled end user device.

The invention yet further relates, in one embodiment, to an IP-enabled end user device for receiving video programs, or segment(s) thereof. In this embodiment, the IP-enabled end user device is configured: (a) for transmitting, to a gateway associated with a cable modem, a command requesting that the IP-enabled end user device obtain one of a plurality of video streams and that the end user device obtain said requested video stream as a unicast stream; (b) for receiving the requested video stream, from the gateway, over the home network; and (c) for decrypting and decoding the requested video stream into the original video program, or segment(s) thereof, so that it can be displayed to the end user.

The invention further relates to computer programs, computer program products and storage mediums comprising computer-readable instructions configured, when executed on a computer, to cause it to carry out steps of the above-described method, or to implement functions of the above-described gateway and/or IP-enabled end user device.

In one embodiment, a computer program comprises computer-readable instructions configured, when executed on a computer, to cause it to participate in the linear distribution of video programs by at least: (i) receiving, from an IP-enabled end user device, a command requesting that the end user device obtain one of a plurality of video streams, and that the end user device obtain said requested video stream as a unicast stream; (ii) upon receiving the command, triggering the conversion, at the gateway, of the requested video stream from multicast to unicast for transmission over a home network provided within subscriber premises; and (iii) transmitting the requested video stream, over the home network, to said IP-enabled end user device.

In one embodiment, a computer program comprises computer-readable instructions configured, when executed on a computer, to cause it to receive video programs, or segment(s) thereof, by at least: (a) transmitting, to a gateway associated to a cable modem, a command requesting that the IP-enabled end user device obtain one of a plurality of video streams, and that the end user device obtain said requested video stream as a unicast stream; (b) receiving the requested video stream, from the gateway, over the home network; and (c) decrypting and decoding the requested video stream into the original video program, or segment(s) thereof, so that it can be displayed to the end user.

In any one of the above-described embodiments, the satellite operator NOC may be, or may be replaced, with a satellite hub.

This summary introduces some features and concepts, which are further explained in the detailed description below. This summary is not intended to be understood as identifying essential features or aspects of the invention, nor is this summary intended to be construed as limiting the scope of the claims.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
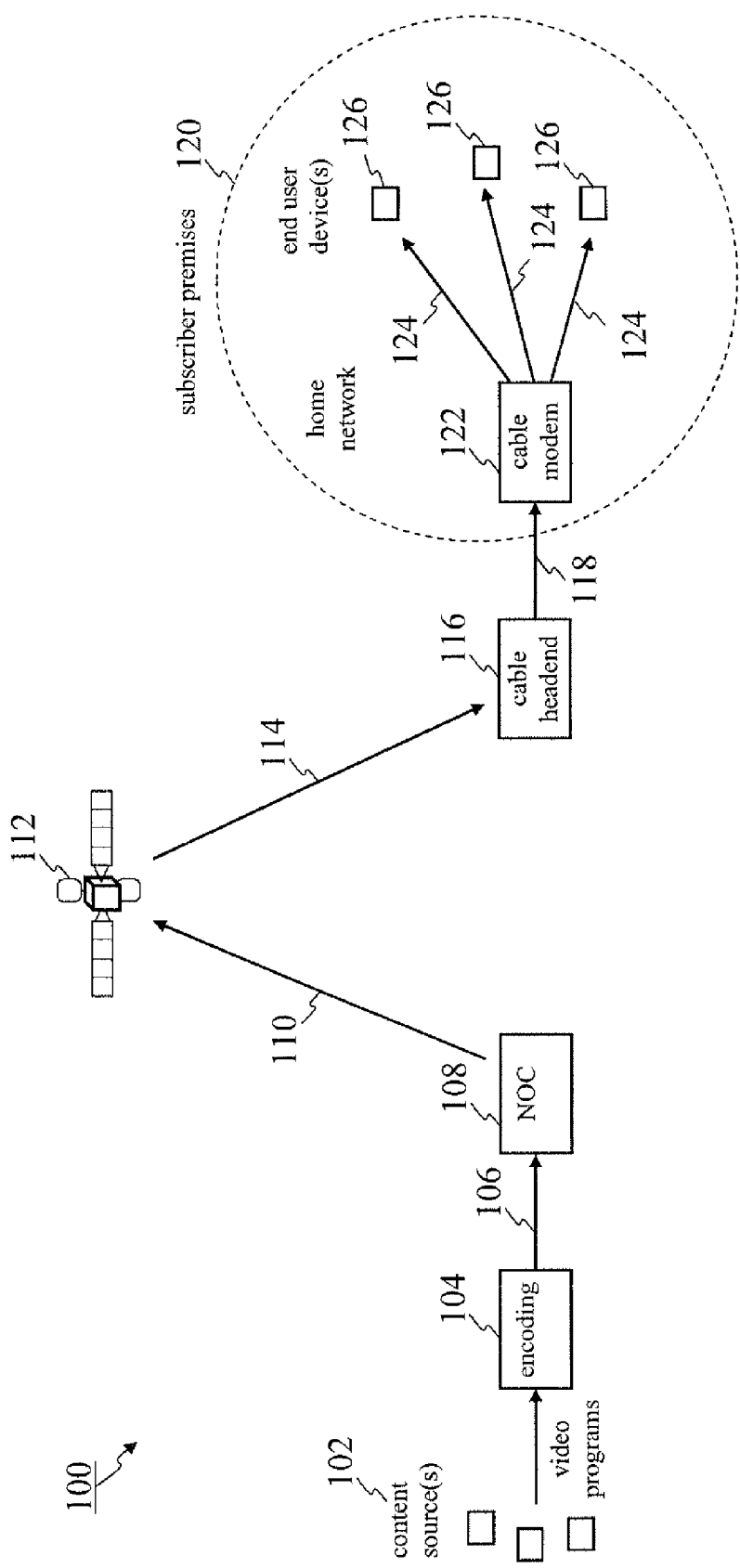
FIG. 1 schematically illustrates an exemplary architecture in which some embodiments of the invention may be put into practice.
Figure 2:
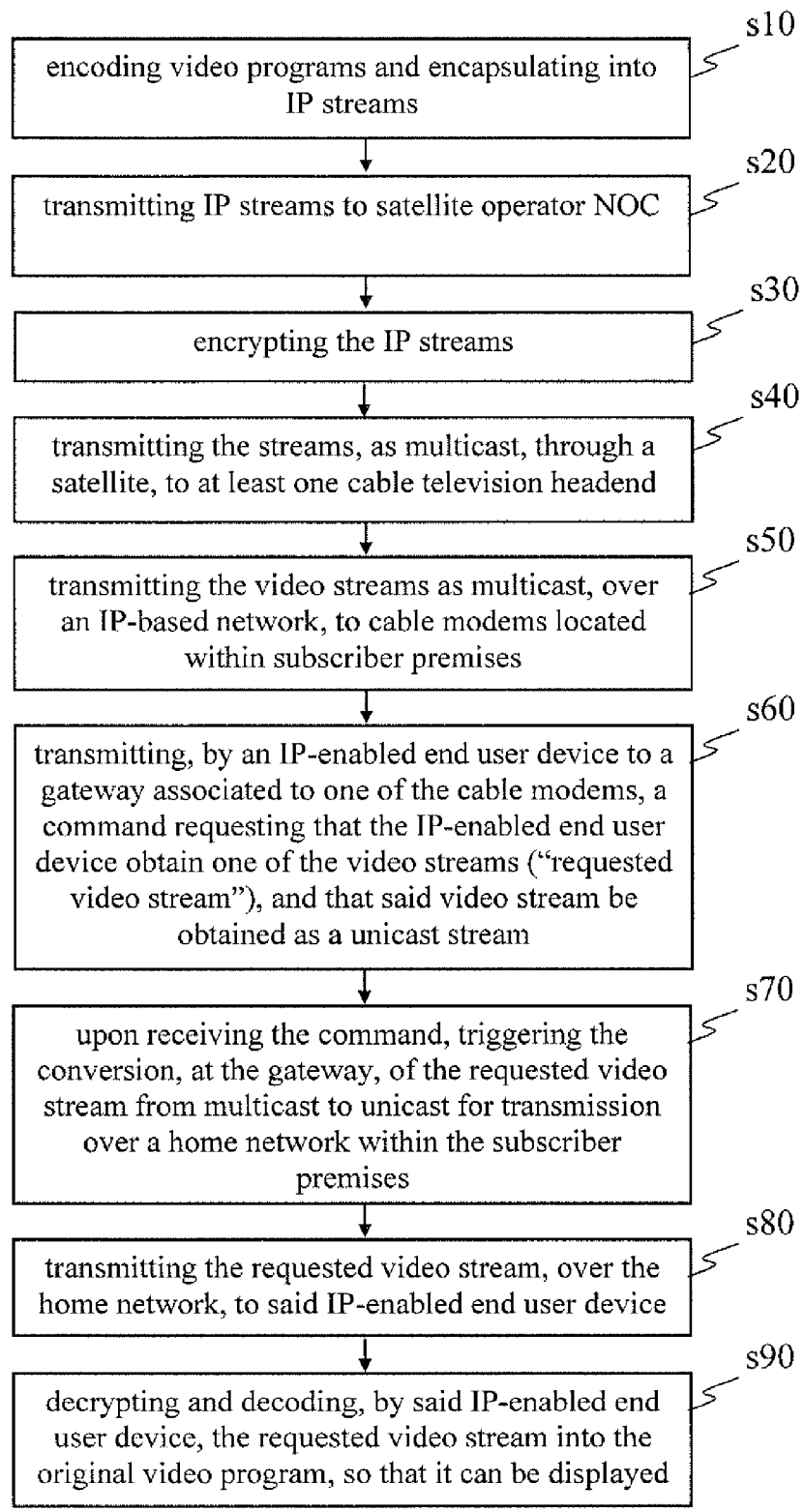
FIG. 2 is a flowchart of a method in accordance with some embodiments of the invention.

FIG. 1 schematically illustrates an exemplary architecture 100 in which some embodiments of the invention may be put into practice. FIG. 2 is a flowchart of a method in some embodiments of the invention. An embodiment of the invention will now be described with reference to both FIGS. 1 and 2, for the sake of convenience.

The architecture 100 is provided for linear distribution of video programs, or segment(s) thereof, to end user devices, i.e. consumer-premises equipment (CPE).

By "linear distribution", it is meant that the video content is provided according to a schedule with assigned broadcast times (i.e., a channel grid), in much the same manner as traditional television broadcasting. The broadcast times are selected by the content programmer. The video content being linearly distributed may for example be live video, i.e. video that is coming off of a camera real-time and onto a TV screen as it is happening. This contrasts with non-linear distribution of content, such as on-demand Internet video streaming (e.g. Netflix).

By "video programs", it is meant video content regardless of whether it is a program or a clip, or whether it is entertainment video or other video content.

Video programs, or segment(s) thereof, are received from one or more content source. The video programs may for example be in at least one of standard-definition (SD), high-definition (HD), ultra-high-definition (UHD), 4K UHD, and 8K UHD definition. At that stage, the video content may be uncompressed.

In step s10, the video programs, or segment(s) thereof, are then encoded and encapsulated into IP video streams, by encoding unit 104. The encoding and encapsulation, although schematically illustrated in FIG. 1 as being carried out by one encoding unit 104, may be performed by distinct elements, either collocated or not. The encoding may, in one embodiment, comprise encoding according to any one of: MPEG2, MPEG4, and High Efficiency Video Coding (HEVC). The IP video streams may then for example be any one of: 10 Mbps video streams, 15 Mbps video streams, 20 Mbps video streams, 25 Mbps video streams, and 30 Mbps video streams. The encoding may involve video compression according to any techniques known to the skilled person, to reduce transmission bandwidth requirements.

In step s20, the IP video streams are then transmitted to a satellite operator network operation center (NOC) 108 over a network 106, which may be any type of network, such as for example a terrestrial network, a fiber network, a terrestrial fiber network, a hybrid fiber coax network, a wireless network, a satellite network, or any combination thereof. Alternatively, satellite operator NOC 108 may be or may be replaced with a satellite hub.

In step s30, satellite operator NOC 108 encrypts the IP video streams, for example for conditional access and/or digital rights management (DRM) purposes. This may involve communicating with a third-party DRM licensing server, as illustrated for example on FIG. 4.

In step s40, the encrypted video streams are then transmitted, as multicast video streams, through an uplink segment 110, a satellite 112, and a downlink segment 114, to one or more cable television headend 116. Only one cable television headend 116 is illustrated in FIG. 1, but there may be any number of cable television headends 116, geographically dispersed over an area covered by the satellite 112. Using satellite communication technology is an especially convenient way to reach relatively small cable operators or other multi-channel video programming distributors (MVPD), such as for example the so-called Tier 2 through Tier 4 cable operators, i.e. cable operators with one million or fewer subscribers. A multichannel video programming distributor (MVPD) may be defined as "a person such as, but not limited to, a cable operator, a multichannel multipoint distribution service, a direct broadcast satellite service, or a television receive-only satellite program distributor, who makes available for purchase, by subscribers or customers, multiple channels of video programming" (U.S. Communications Act of 1934: as amended by Telecom Act of 1996, Section 602(13)). These MVPDs can also be government entities—at any level—or even electric companies (i.e. public utilities). As long as these providers have a headend taking programming off of a satellite, they can potentially benefit from the invention.

At that stage, i.e. after transmission in step s40 to a cable television headend 116, the video streams may optionally, in one embodiment, be decrypted and re-encrypted at the cable television headend 116, for controlling which cable subscribers may access the content. This may involve communicating with a third-party DRM licensing server, as illustrated for example on FIG. 4 (through an exemplary cable operator subscriber management system).

The cable television headend(s) 116 in turn transmits, in step s50, the video streams as multicast video streams, over an IP-based network 118, to cable modems 122 located within subscriber premises 120. In other words, each cable modem 122 typically receives a bundle of video streams in multicast mode. IP-based network 118 may, in some embodiments, be a DOCSIS-compliant network and/or a hybrid fiber coax (HFC) network. The delivery of linear video content over coaxial cable systems in multicast is a very efficient delivery mechanism.

At one point in time, in step s60, an IP-enabled end user device 126 transmits, to a gateway (not illustrated in FIG. 1) associated with one of the cable modems 122, a command (i.e. an instruction) requesting that the IP-enabled end user device 126 obtain one of the video streams (said video stream being hereinafter referred to as "requested video stream"), and that the IP-enabled end user device 126 obtain the requested video stream as a unicast stream. In other words, the IP-enabled end user device 126, or CPE, makes a unicast request to the gateway. In one embodiment, the command is an explicit command in which a video stream is requested by being identified, and the multicast-to-unicast conversion is requested for the video stream in the same command.

The command may, in one embodiment, be in the form of one or more messages or packets, composed of any number of bits understandable by the gateway.

In step s70, upon receiving the command, the gateway triggers the conversion, at the gateway, of the requested video stream from multicast to unicast for transmission over a home network 124 provided within the subscriber premises 120. Triggering the multicast-to-unicast conversion at the gateway upon being instructed to do so by the end user device is a particularly advantageous mechanism. In one embodiment, the conversion is from UDP multicast to UDP unicast. The home network may for example be a Wi-Fi, Ethernet, or power-line communication (PLC) network.

In step s80, the requested video stream is then transmitted, over the home network 124, to said IP-enabled end user device 120, which decrypts and decodes, in step s90, the requested video stream into the original video program, or segment(s) thereof, so that it can be displayed to the end user. This means that the video stream may be immediately displayed, or recorded instead of being directly displayed. The step s90 of decrypting the requested video stream may, in one embodiment, be carried out for example for conditional access and/or DRM purposes. Thus, a system may be provided wherein only authorized subscribers can access the video content. The step s90 of decrypting may involve communicating with a third-party DRM licensing server, as illustrated for example on FIG. 4 (see arrows labelled "DRM License Request" and "DRM License Delivery").

The gateway (not illustrated on FIG. 1) is associated with a cable modem 122, which means that the gateway is connected to the cable modem. The gateway and the cable modem 122 may be collocated, or integrally formed within one device, or, alternatively, the gateway may be provided as separated set-top box.

The end user device may be for example a desktop computer, a smart TV device, a tablet device, a handheld device, a smartphone, a streaming device, or a gaming device.

In one embodiment (not illustrated in the drawings), the method further comprises converting, by the gateway, the requested video stream in at least one of HTTP Live Stream (HLS) format, MPEG-DASH and any other adaptive bit rate format. In other words, the gateway may generally be used for preparing and/or formatting the video stream for viewing on the end user device.

In one embodiment (not illustrated in the drawings), the method is such that, prior to transmitting s60 the above-mentioned command, the IP-enabled end user device selects, from a list of video stream identifiers (identifying the bundle of video streams received at the cable modem), one of the video streams to be obtained.

In one embodiment (not illustrated in the drawings), prior to selecting one of the video streams from the list of video stream identifiers, the IP-enabled end user device receives the list of video stream identifiers from the gateway. For example, in one embodiment, all the video streams distributed over the satellite, and then multicast over the coaxial cable systems to the cable modem, may be listed in a "content guide" available to the end user. In other words, a bundle of multicast video streams reaches the cable modems, and the content guide lists the components of the bundle that the end user device may request. In one embodiment, the end user device then explicitly requests conversion from multicast to unicast by sending a command to the gateway. The network configuration may therefore be static, and thus simple and manageable.

There are many possible approaches and techniques to perform the actual multicast-to-unicast conversion, which are known to the skilled persons. The embodiments of the present invention are not limited to any particular way of performing the conversion.

In one embodiment, the decryption performed in step s80 comprises an authentication process, based upon identifying the end user's gateway, end user device, app (i.e. software running on the end user device), and/or credentials that determines what rights the end user has for viewing particular content.

In one embodiment, the decryption performed in step s80 comprises authorizing the individual end user to decrypt the video content on a per-application basis (or per-household, per-gateway, or per-subscriber basis).

Figure 3:
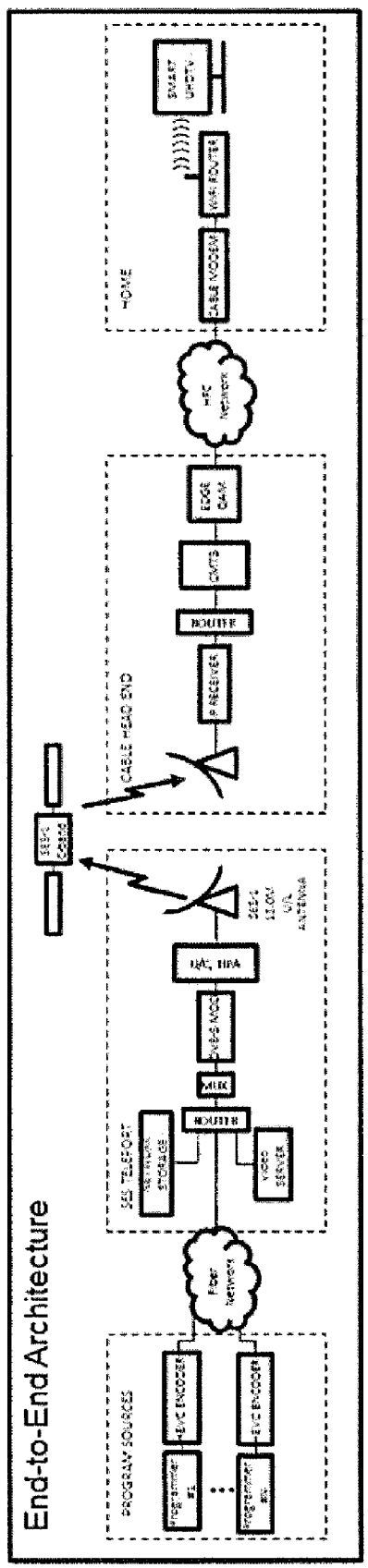
FIG. 3 schematically illustrates another exemplary architecture in which some embodiments of the invention may be put into practice.

FIG. 3 schematically illustrates another exemplary architecture in which some embodiments of the invention may be put into practice. The end-to-end architecture comprises:
  (1) a number N of content source programmers ("Programmer #1" to "Programmer #N") for providing the original video programs, or segment(s) thereof;
  (2) HEVC encoders;
  (3) a fiber network over which the encoded video streams are transmitted to the satellite operator network operation center (NOC),
  (4) the satellite operator NOC facility;
  (5) a satellite through which the video streams are transmitted, for example in the C band (any other suitable frequency band may be used as well), using DVB-S2;
  (6) a cable headend facility;
  (7) a HFC network (e.g. DOCSIS-compliant) into which the IP video streams may be injected, and
  (8) the subscriber's premises comprising the cable modem, a Wi-Fi router to transfer the video stream(s) over the home network, and a smart TV (e.g. a smart UHDTV) to receive and display (or record) the video stream(s).

Figure 4:
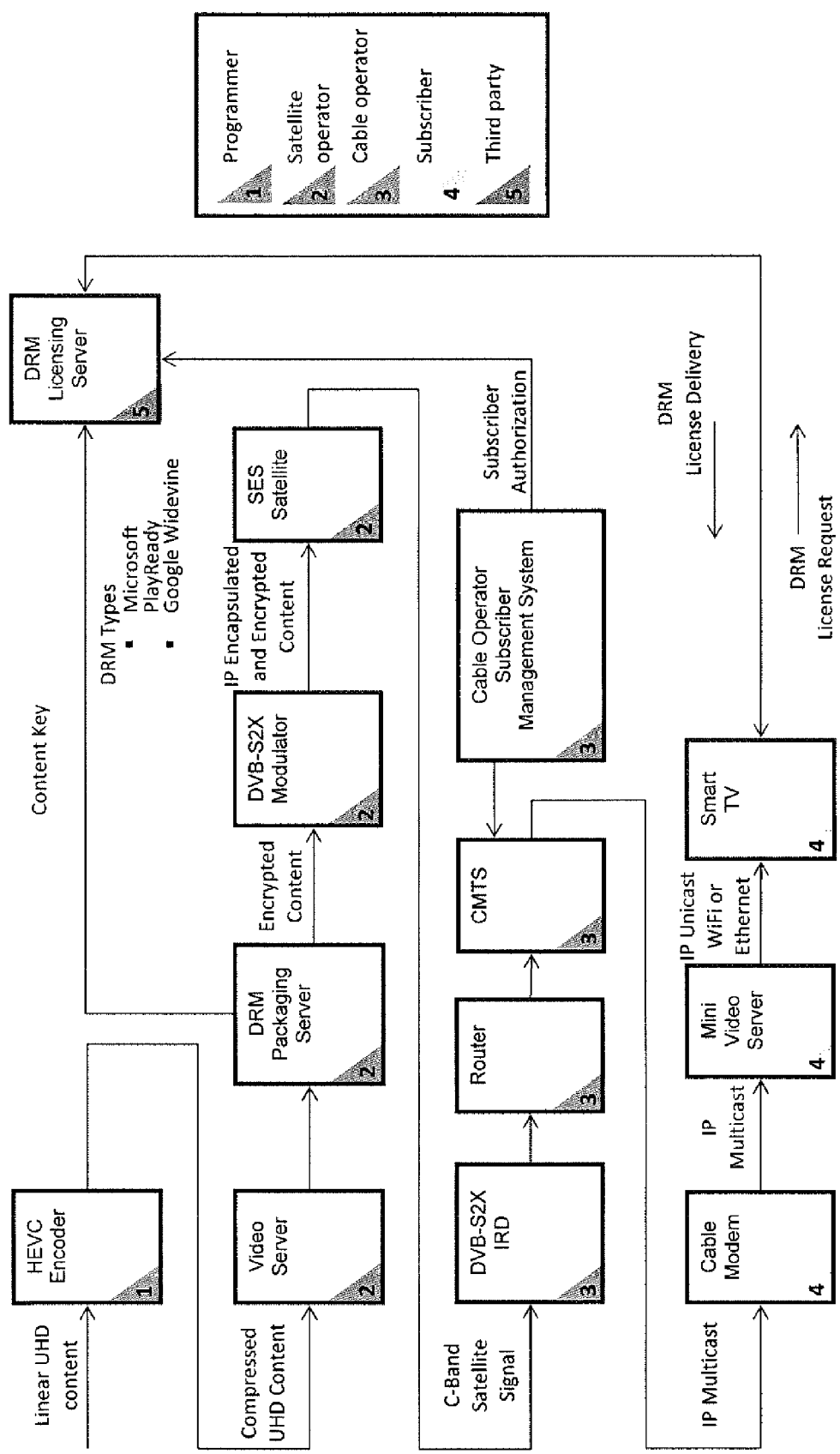
FIG. 4 is a functional block diagram of a method and system in some embodiments of the invention.

FIG. 4 is a functional block diagram of a method and system in one embodiment of the invention, for the delivery of video services, such as for example SD, HD, UHD, 4K UHD or 8K UHD. In particular, FIG. 4 schematically illustrates a method and system for multicast delivery of real-time video content over IP networks for delivery to IP-enabled devices in the home.

The element marked with the triangle labelled "1" is under the control of the programmer (i.e. video content programmer). The elements marked with the triangle labelled "2" are under the control of the satellite operator. The elements marked with the triangle labelled "3" are under the control of the cable operator—or any other MVPD. The elements marked with the triangle labelled "4" are under the control of the cable subscriber. Finally, the element marked with the triangle labelled "5" is under the control of the third party.

The linear content sources (i.e., the "programmers") need not directly uplink linear video content to satellites for distribution as the satellite operator provides that service for them.

The process starts by taking uncompressed or mezzanine-quality UHD video from each UHD content source, and encoding (or re-encoding) the files with HEVC to an approximate 20 Mbps IP stream and transporting the video to the satellite operator's NOC via a terrestrial fiber or the like. The satellite operator's NOC encrypts the HEVC UHD video stream with DRM software and then uplinks the video content to a satellite, such as for example a geostationary or geosynchronous satellite.

The cable operator—or, more generally, the MVPD—then receives the signal, decrypts and re-encrypts or passes through the pre-encrypted content and then distributes it directly into their DOCSIS network, where it is transmitted in a multicast format and received by their subscribers via cable modems located within the subscribers premises. The architecture therefore enables the multicasting of television, and more specifically, UHDTV, using the DOCSIS standard.

At the subscribers premises, in the gateway, the UHD TV signal is translated, upon request, from multicast to unicast, and then distributed via the home network (typically Wi-Fi, though Ethernet or power line communications networks may also be possible) to IP-enabled end user devices, such as smart TVs, computers, tablets, smartphones, or streaming devices, through an app installed on these devices, which decode the video content. This multicast-to-unicast conversion is performed at the home, if requested by the end user device in the above-discussed command. IP hubs and switches typically found in consumer environments are generally not designed to efficiently and effectively pass multicast traffic, so that the multicast-to-unicast conversion is particularly advantageous for providing high QoS.

Software executed in the end user device performs the final decryption and processes the digital rights management (DRM) of the video content (i.e., the encryption), thereby only allowing authorized users access to the correct video content. For example, a user who has subscribed to a premium channel can only view that channel if their gateway or modem is authorized. The list of authorized users may be stored by the satellite operator so that the end-to-end encryption process works correctly, but each cable operator—or, more generally, each MVPD—may use a virtualized DRM/customer authorization management system, giving them as much control over their subscriber management process as they choose. In one embodiment, a flexible, virtualized decryption/DRM method is provided allowing subscriber management to be managed by the cable operator—or MVPD—, or managed end-to-end by the satellite operator.

Processing the DRM at the end user device has numerous advantages over authenticating multicast users. For example, DRM allows video content to be deployed ahead of time (e.g., during off-peak hours when many users are asleep or at work) and unlock it for viewing at a precise time and date. In one embodiment, the system also allows content providers, cable operators, or MVPDs to limit, if wished, the number of simultaneous end user devices viewing the same piece of content in a home. In one embodiment, video-on-demand (VOD) or catch-up content may be set to expire on a certain date, or have a tiered pricing structure wherein, for example, the most recent episode of a show is free to view, but after a newer episode has been released, viewing the old episodes requires a rental or purchase fee.

Through the app (the software executed on the end user device), the user can view standard definition, high definition, or ultra-high definition content linearly as it airs, or on-demand. The app may be managed by the satellite operator.

Some embodiments of the invention therefore enable cost effective and quickly deployable UHD content over cable TV systems.

Figure 5:
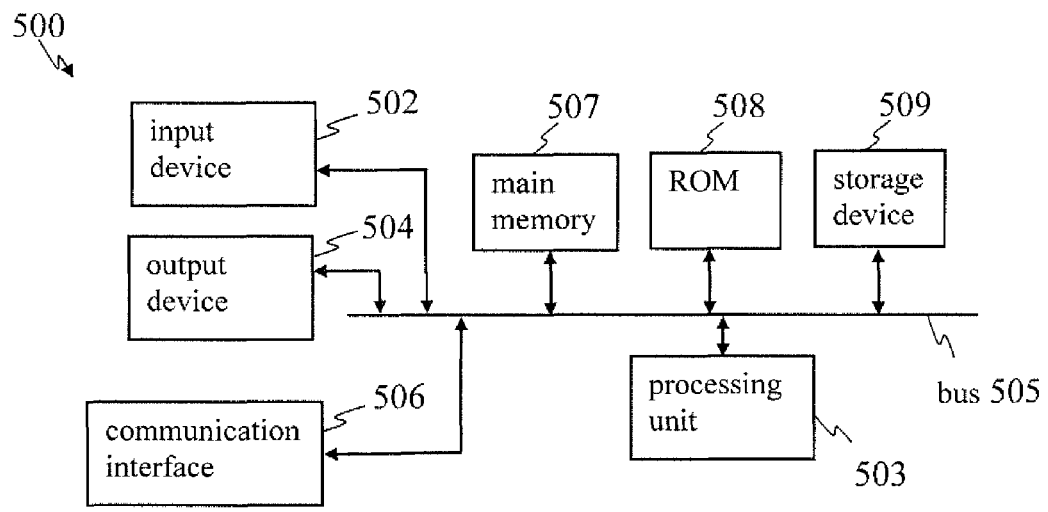
FIG. 5 schematically illustrates an exemplary implementation of a computer that may be used in some embodiments of the invention.

FIG. 5 is a schematic diagram of an exemplary implementation of a computer 500 that may be used in embodiments of the invention, for example for implementing a gateway or IP-enabled end user device. In other words, a gateway or IP-enabled end user device may involve such a computer 500, as schematically illustrated in FIG. 5. As illustrated, computer 500 may include a bus 505, a processing unit 503, a main memory 507, a ROM 508, a storage device 509, an input device 502, an output device 504, and a communication interface 506. Bus 505 may include a path that permits communication among the components of computer 500.

Processing unit 503 may include a processor, a microprocessor, or processing logic that may interpret and execute instructions. Main memory 507 may include a RAM or another type of dynamic storage device that may store information and instructions for execution by processing unit 503. ROM 508 may include a ROM device or another type of static storage device that may store static information and instructions for use by processing unit 503. Storage device 509 may include a magnetic and/or optical recording medium and its corresponding drive.

Input device 502 may include a mechanism that permits an operator to input information to computer 500, such as a keypad, a keyboard, a mouse, a pen, voice recognition and/or biometric mechanisms, etc., and/or a mechanism that receives input for example from an antenna followed by an analog-to-digital converter. Output device 504 may include a mechanism that outputs information to the operator, including a display, a printer, a speaker, etc., and/or a mechanism that provides output for example to a digital-to-analog converter for frequency translation. Communication interface 506 may include any transceiver-like mechanism that enables computer 500 to communicate with other devices and/or systems. For example, communication interface 506 may include mechanisms for communicating with another device or system via a network.

Computer 500 may perform certain operations or processes described herein. These operations may be performed in response to processing unit 503 executing software instructions contained in a computer-readable medium, such as main memory 507, ROM 508, and/or storage device 509. A computer-readable medium may be defined as a physical or a logical memory device. For example, a logical memory device may include memory space within a single physical memory device or distributed across multiple physical memory devices. Each of main memory 507, ROM 508 and storage device 509 may include computer-readable media. The magnetic and/or optical recording media (e.g., readable CDs or DVDs) of storage device 509 may also include computer-readable media. The software instructions may be read into main memory 507 from another computer-readable medium, such as storage device 509, or from another device via communication interface 506.

The software instructions contained in main memory 509 may cause processing unit 503 to perform operations or processes described herein, such as those carried out by the gateway or by the end user device. Alternatively, hardwired circuitry may be used in place of or in combination with software instructions to implement processes and/or operations described herein. Thus, implementations described herein are not limited to any specific combination of hardware and software.

Figures 6, 7:
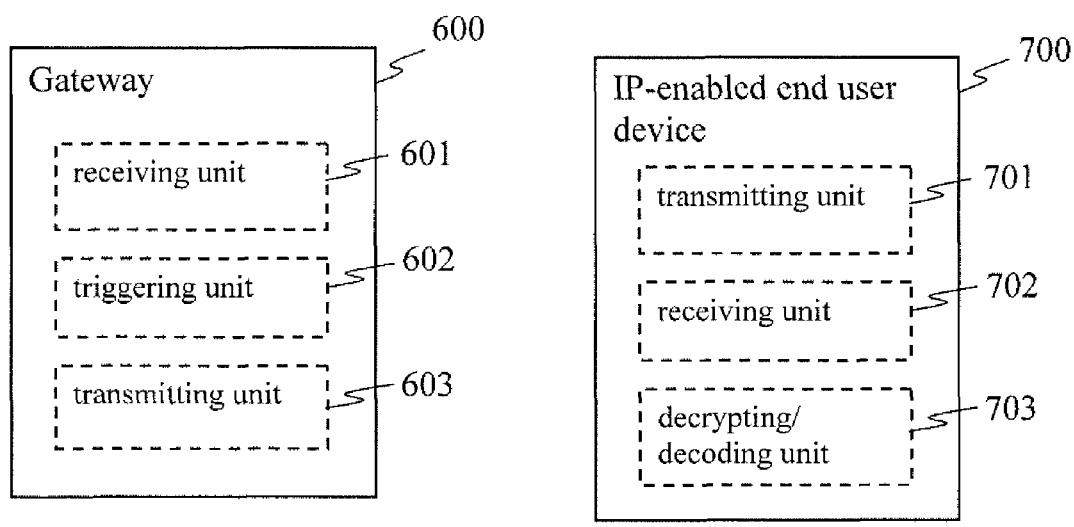
FIG. 6 schematically illustrates a gateway in some embodiments of the invention.
FIG. 7 schematically illustrates an IP-enabled end user device in some embodiments of the invention.

FIG. 6 schematically illustrates a gateway 600 configured for participating in the linear distribution of video programs, or segment(s) thereof, to end user devices. Gateway 600 may be implemented at least partially on a computer 500 as discussed with reference to FIG. 5. Gateway 600 comprises a receiving unit 601, a triggering unit 602, and a transmitting unit 603. Receiving unit 601 is configured for receiving, from an IP-enabled end user device, a command requesting that the IP-enabled end user device obtain one of a plurality of video streams, said video stream being hereinafter referred to as "requested video stream", and that the IP-enabled end user device obtain the requested video stream as a unicast stream. Triggering unit 602 is configured for, upon receiving the command, triggering the conversion, at the gateway, of the requested video stream from multicast to unicast for transmission over a home network provided within subscriber premises. Transmitting unit 603 is configured for transmitting the requested video stream, over the home network, to said IP-enabled end user device.

FIG. 7 schematically illustrates an IP-enabled end user device 700 configured for receiving video programs, or segment(s) thereof. IP-enabled end user device 700 may be implemented at least partially on a computer 500 as discussed with reference to FIG. 5. IP-enabled end user device 700 comprises a transmitting unit 701, a receiving unit 702, and a decrypting/decoding unit 703. Transmitting unit 701 is configured for transmitting, to a gateway associated to a cable modem, a command requesting that the IP-enabled end user device obtain one of a plurality of video streams, said video stream being hereinafter referred to as "requested video stream", and that the IP-enabled end user device obtain the requested video stream as a unicast stream. Receiving unit 702 is configured for receiving the requested video stream, from the gateway, over the home network. Decrypting/decoding unit 703 is configured for decrypting and decoding the requested video stream into the original video program, or segment(s) thereof, so that it can be displayed to the end user.

Where the terms "receiving unit" 601, "triggering unit" 602, "transmitting unit" 603, "transmitting unit" 701, "receiving unit" 702, "decrypting/decoding unit" 703, etc. are used herewith, no restriction is made regarding how distributed these elements may be and regarding how gathered elements may be. That is, the constituent elements thereof may be distributed in different software or hardware components or devices for bringing about the intended function. A plurality of distinct elements may also be gathered for providing the intended functionalities.

Any one of the above-referred units of a gateway transmitter may be implemented in hardware, software, field-programmable gate array (FPGA), application-specific integrated circuit (ASICs), and/or firmware, or the like.

In further embodiments of the invention, any one of the above-mentioned receiving unit 601, triggering unit 602, transmitting unit 603, transmitting unit 701, receiving unit 702, decrypting/decoding unit 703, etc. is replaced by receiving means 601, triggering means 602, transmitting means 603, transmitting means 701, receiving means 702, decrypting/decoding means 703, etc. respectively, or, by a receiver 601, triggering element 602, transmitter 603, transmitter 701, receiver 702, decrypter/decoder 703, etc. for performing the functions of the above-mentioned receiving unit 601, triggering unit 602, transmitting unit 603, transmitting unit 701, receiving unit 702, decrypting/decoding unit 703, etc.

In further embodiments of the invention, any one of the above-described steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

CMTS Cable modem termination system
CPE Customer-premises equipment
DOCSIS Data Over Cable Service Interface Specification
DRM Digital rights management
DVB-S2 Digital Video Broadcasting—Satellite—Second Generation
HD High-definition
HEVC High Efficiency Video Coding
HFC Hybrid fiber coax
HLS HTTP Live Stream
HTTP Hypertext Transfer Protocol
IP Internet Protocol
MPEG Moving Picture Experts Group
MPEG-DASH MPEG-Dynamic Adaptive Streaming over HTTP
MVPD Multichannel video programming distributor
NOC Network operation center
OTT Over-the-top
QoS Quality of service
ROM Read-only memory
SD Standard-definition
UDP User Datagram Protocol
UHD Ultra-high-definition
UHDTV Ultra-high-definition television
VOD Video-on-demand

The invention claimed is:

1. Method for linear distribution of video programs, or segment(s) thereof, to end user devices, the method comprising:
  encoding video programs, or segment(s) thereof, received from at least one content source and encapsulating them into Internet Protocol (IP) video streams;
  transmitting the IP video streams to at least one of a satellite operator network operation center and a satellite hub;
  encrypting, by the at least one of a satellite operator network operation center and a satellite hub, the IP video streams;
  transmitting the encrypted video streams, as multicast video streams, through a satellite, to at least one cable television headend;
  transmitting, by the at least one cable television headend, the video streams as multicast video streams, over an IP-based network, to cable modems located within subscriber premises;
  transmitting, by an IP-enabled end user device to a gateway associated to one of the cable modems, a command requesting that the IP-enabled end user device obtain one of the video streams, said video stream being hereinafter referred to as "requested video stream", and that the IP-enabled end user device obtain the requested video stream as a unicast stream;
  upon receiving the command, triggering the conversion, at the gateway, of the requested video stream from multicast to unicast for transmission over a home network provided within the subscriber premises;
  transmitting the requested video stream, over the home network, to said IP-enabled end user device; and
  decrypting and decoding, by said IP-enabled end user device, the requested video stream into the original video program, or segment(s) thereof, so that it can be displayed to the end user.

2. The method of claim 1 for linear distribution of video programs in at least one of: standard-definition (SD), high-definition (HD), ultra-high-definition (UHD), 4K UHD definition, and 8K UHD definition.

3. The method of claim 1, wherein the step of encoding the received video programs comprises encoding them according to any one of: MPEG2, MPEG4, and High Efficiency Video Coding (HEVC).

4. The method according to claim 1, wherein the step of transmitting the IP video streams to at least one of a satellite operator network operation center and a satellite hub comprises transmitting the encoded video stream over a terrestrial fiber network.

5. The method according to claim 1, wherein the step of encrypting the IP video streams, and the step of decrypting the requested video stream, are carried out for at least one of: conditional access and digital rights management (DRM) purposes.

6. The method according to claim 1, wherein the step of transmitting, by the at least one cable television headend, the video streams as multicast video streams, over an IP-based network, to cable modems located within subscriber premises, comprises transmitting the video streams in multicast over a DOCSIS network.

7. The method according to claim 1, wherein the step of transmitting, by the at least one cable television headend, the video streams as multicast video streams, over an IP-based network, to cable modems located within subscriber premises, comprises transmitting the video streams in multicast over a hybrid fiber coax (HFC) network.

8. The method according to claim 1, wherein the step of triggering the conversion, at the gateway, of the requested video stream from multicast to unicast for transmission over the home network, comprises triggering the conversion from UDP multicast to UDP unicast.

9. The method according to claim 1, further comprising converting, by the gateway, the requested video stream in at least one of: HTTP Live Stream (HLS) format, MPEG-DASH, and any other adaptive bit rate format.

10. The method according to claim 1, wherein, prior to transmitting, by the IP-enabled end user device, said command, the IP-enabled end user device selects, from a list of video stream identifiers, one of the video streams to be obtained.

11. The method of claim 10, wherein, prior to selecting, from the list of video stream identifiers, one of the video streams to be obtained, the IP-enabled end user device receives the list of video stream identifiers from the gateway.

12. System for linear distribution of video programs, or segment(s) thereof, to end user devices, the system comprising:
  an encoder configured
    for encoding video programs, or segment(s) thereof, received from at least one content source and encapsulating them into Internet Protocol (IP) video streams; and for transmitting the IP video streams to at least one of a satellite operator network operation center and a satellite hub;
at least one of a satellite operator network operation center and a satellite hub, configured
for encrypting the IP video streams; and
for transmitting the encrypted video streams, as multicast video streams, through a satellite, to at least one cable television headend;
at least one cable television headend configured for transmitting the video streams as multicast video streams, over an IP-based network, to cable modems located within subscriber premises;
an IP-enabled end user device configured for transmitting, to a gateway associated to one of the cable modems, a command requesting that the IP-enabled end user device obtain one of the video streams, said video stream being hereinafter referred to as "requested video stream", and that the IP-enabled end user device obtain the requested video stream as a unicast stream; and
a gateway configured
for, upon receiving the command, triggering the conversion, at the gateway, of the requested video stream from multicast to unicast for transmission over a home network provided within the subscriber premises; and
for transmitting the requested video stream, over the home network, to said IP-enabled end user device;
the IP-enabled end user device being further configured for decrypting and decoding the requested video stream into the original video program, or segment(s) thereof, so that it can be displayed to the end user.

13. The system according to claim 12, wherein the at least one of satellite operator network operation center and a satellite hub is configured for encrypting the IP video streams for at least one of conditional access and digital rights management (DRM) purposes, and the IP-enabled end user device is configured for decrypting the requested video stream for at least one of: conditional access and digital rights management (DRM) purposes.

14. The system according to claim 12, wherein the at least one cable television headend is configured for transmitting the video streams as multicast video streams, over an DOCSIS IP-based network, to the cable modems.

15. The system according to claim 12, wherein the at least one cable television headend is configured for transmitting the video streams as multicast video streams, over an hybrid fiber coax IP-based network, to the cable modems.

16. The system according to claim 12, wherein the gateway is configured for, upon receiving the command, triggering the conversion, at the gateway, of the requested video stream from UDP multicast to UDP unicast.

17. Gateway for participating in the linear distribution of video programs, or segment(s) thereof, to end user devices, the gateway being configured at least:
for receiving, from an IP-enabled end user device, a command requesting that the IP-enabled end user device obtain one of a plurality of video streams, said video stream being hereinafter referred to as "requested video stream", and that the IP-enabled end user device obtain the requested video stream as a unicast stream;
for, upon receiving the command, triggering the conversion, at the gateway, of the requested video stream from multicast to unicast for transmission over a home network provided within subscriber premises; and
for transmitting the requested video stream, over the home network, to said IP-enabled end user device.

18. IP-enabled end user device for receiving video programs, or segment(s) thereof, the IP-enabled end user device being configured at least:
for transmitting, to a gateway associated to a cable modem, a command requesting that the IP-enabled end user device obtain one of a plurality of video streams, said video stream being hereinafter referred to as "requested video stream", and that the IP-enabled end user device obtain the requested video stream as a unicast stream;
for receiving the requested video stream, from the gateway, over the home network; and
for decrypting and decoding the requested video stream into the original video program, or segment(s) thereof, so that it can be displayed to the end user.

19. Storage medium storing a computer program comprising computer-readable instructions configured, when executed on a computer, to cause the computer to participate in the linear distribution of video programs by at least:
receiving, from an IP-enabled end user device, a command requesting that the IP-enabled end user device obtain one of a plurality of video streams, said video stream being hereinafter referred to as "requested video stream", and that the IP-enabled end user device obtain the requested video stream as a unicast stream;
upon receiving the command, triggering the conversion, at the gateway, of the requested video stream from multicast to unicast for transmission over a home network provided within subscriber premises; and
transmitting the requested video stream, over the home network, to said IP-enabled end user device.

20. Storage medium storing a computer program comprising computer-readable instructions configured, when executed on a computer, to cause the computer to receive video programs, or segment(s) thereof, by at least:
transmitting, to a gateway associated to a cable modem, a command requesting that the IP-enabled end user device obtain one of a plurality of video streams, said video stream being hereinafter referred to as "requested video stream", and that the IP-enabled end user device obtain the requested video stream as a unicast stream;
receiving the requested video stream, from the gateway, over the home network; and
decrypting and decoding the requested video stream into the original video program, or segment(s) thereof, so that it can be displayed to the end user.

* * * * *